United States Patent
Roberts

(10) Patent No.: US 7,547,032 B1
(45) Date of Patent: Jun. 16, 2009

(54) TRAILER CAPABLE OF TOWING MULTIPLE VEHICLES

(76) Inventor: Bruce A. Roberts, 314 E. Georgia Ave., Bessemer City, NC (US) 28016

( * ) Notice: Subject to any disclaimer, the term of this patent is extended or adjusted under 35 U.S.C. 154(b) by 312 days.

(21) Appl. No.: 11/520,935

(22) Filed: Sep. 13, 2006

(51) Int. Cl.
*B60P 3/10* (2006.01)

(52) U.S. Cl. .............. 280/414.1; 280/414.2; 280/414.3; 114/344; 114/51; 414/484; 414/495

(58) Field of Classification Search .............. 180/414.1, 180/414.2, 414.3; 114/344, 51; 414/484, 414/495
See application file for complete search history.

(56) References Cited

U.S. PATENT DOCUMENTS

| | | | |
|---|---|---|---|
| 3,677,425 A | 7/1972 | Patten | |
| 4,420,165 A * | 12/1983 | Goodin | 280/414.1 |
| 4,705,289 A * | 11/1987 | Weber | 280/414.1 |
| 4,932,830 A * | 6/1990 | Woodburn | 414/495 |
| 5,431,525 A * | 7/1995 | Scott | 414/538 |
| 5,518,261 A | 5/1996 | Godbersen | |
| 5,664,516 A | 9/1997 | Breeden | |
| 5,704,756 A | 1/1998 | Marteney et al. | |
| 5,772,388 A * | 6/1998 | Clark | 414/484 |
| 6,217,053 B1 * | 4/2001 | Forsythe et al. | 280/414.3 |
| 7,143,713 B1 * | 12/2006 | Richardson et al. | 114/344 |

\* cited by examiner

*Primary Examiner*—Paul N Dickson
*Assistant Examiner*—Marlon A Arce

(57) ABSTRACT

A combined boat and jet ski towing trailer includes a jet ski support ramp on the arm that connects a trailer body to the towing vehicle. The jet ski supporting ramp is inclined and oriented at an oblique angle to the longitudinal axis of the trailer body to facilitate loading and unloading.

3 Claims, 2 Drawing Sheets

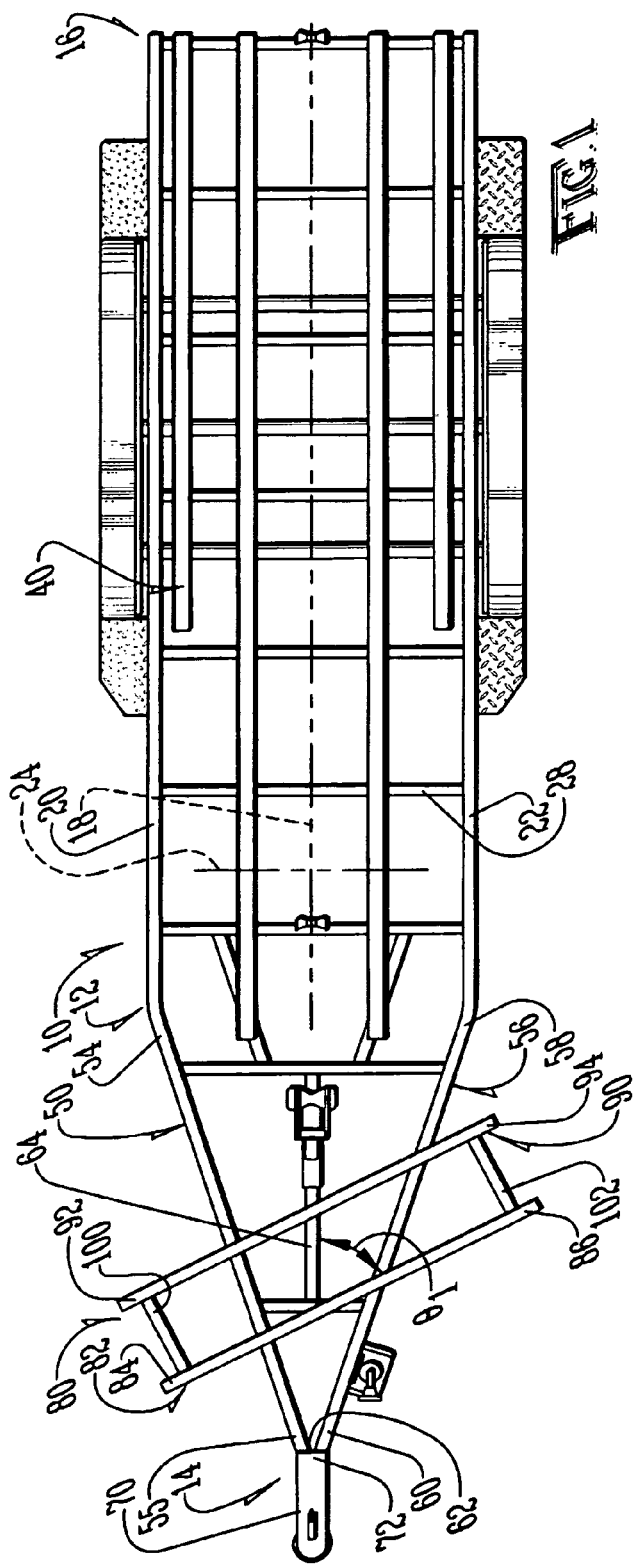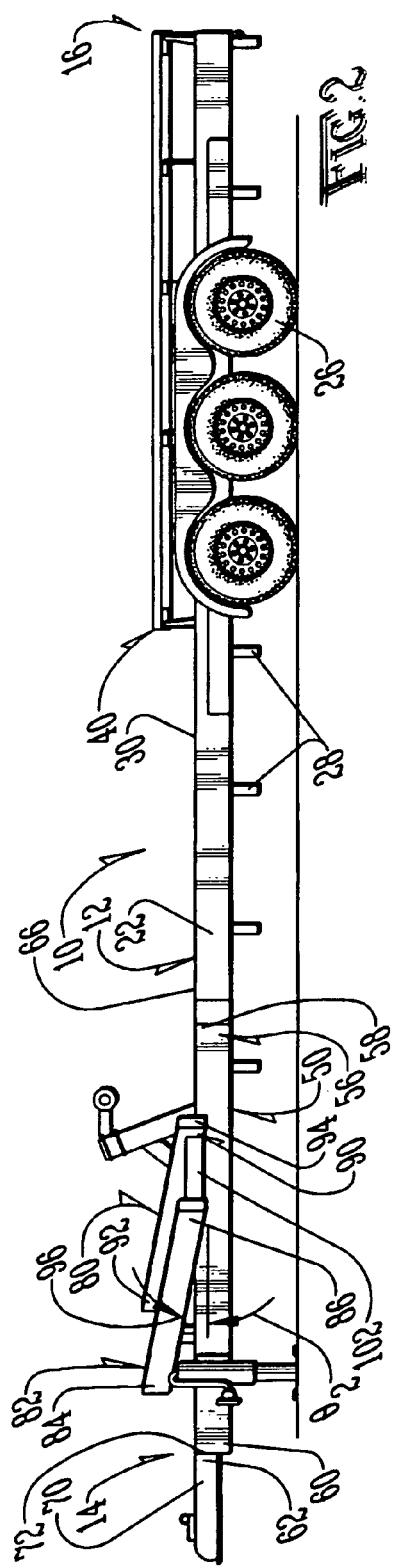

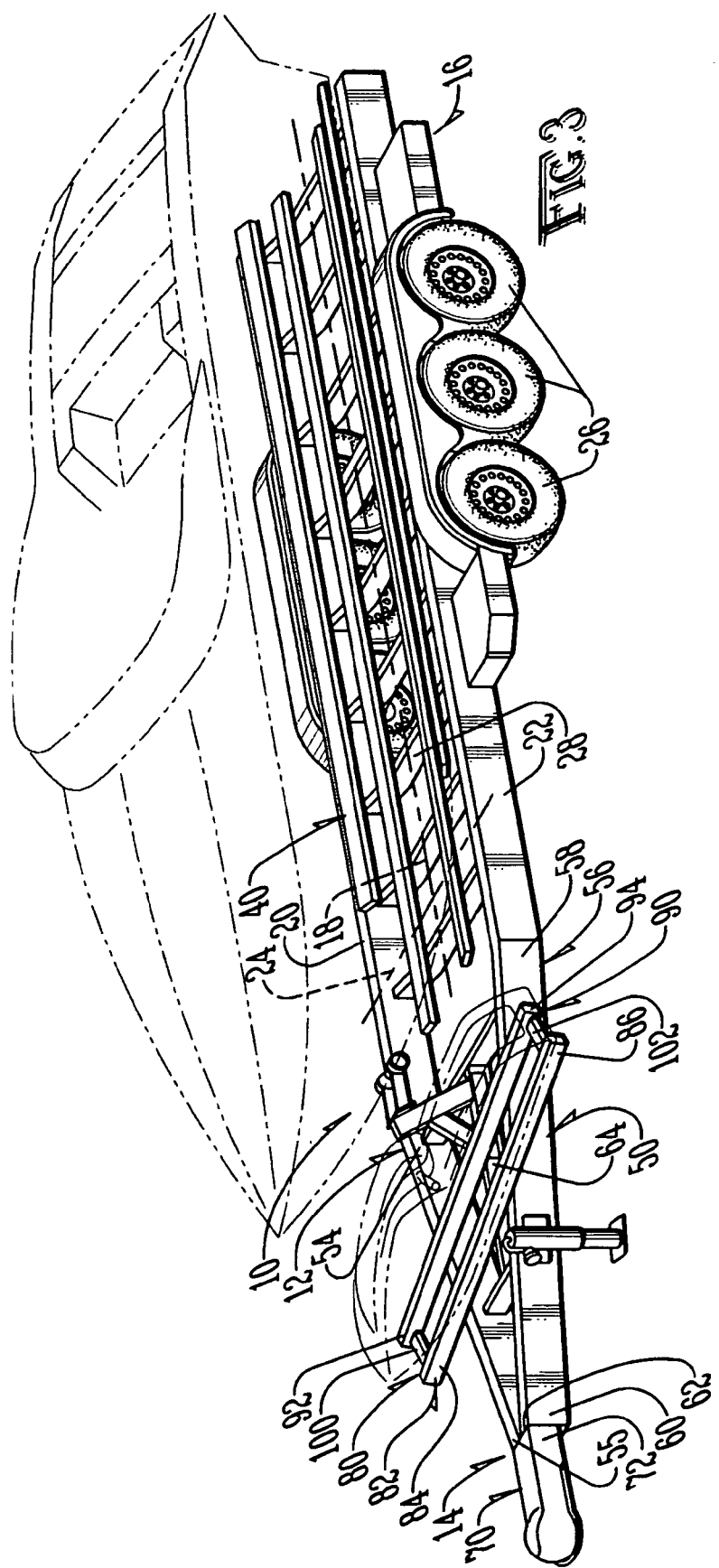

US 7,547,032 B1

TRAILER CAPABLE OF TOWING MULTIPLE VEHICLES

TECHNICAL FIELD OF THE INVENTION

The present invention relates to the general art of trailers, and to the particular field of towed trailers.

BACKGROUND OF THE INVENTION

The term "personal watercraft" refers to a class of watercraft designed to carry one to three passengers in a standing position or seated in tandem with a seat similar to a motorcycle seat. As used herein, "personal watercraft" refers to any of the class of one to three passengers, motorized watercraft with tandem seating as in a motorcycle or with the user standing or kneeling on the vehicle.

Personal watercraft are commonly stored at home and transported to a lake or other water recreation area for use. The motorized personal watercraft, may weigh several hundred pounds each, are often transported to and from the launch site using a specialized trailer. Or, these bulky watercraft may be transported between storage and the water launch site using the back of a pick-up truck, or the like.

In recent times, it has become common for a group of people to spend time on the water. Often, someone in this group wishes to use a personal watercraft while someone else may wish to use a boat. This situation may create a problem with transporting both water vehicles to the body of water. In some instances, it may require multiple trips.

Furthermore, although the advent in the pleasure boat field of personal ski boats and the like brought a plethora of streamlined and stylish ski boats to satisfy those of all persuasions as to boat styles and sizes, the trailers for supporting and transporting this new personal phenomenon of the boating industry remained of the work horse type. Thus the contemporary trailers comprised a generally box-type frame with cross members supported by conventional brackets, either bunk or roller units, and with one or more vertically upright posts on the tongue or interior frame members for supporting winches. Although these ski boat trailers were functional, they were certainly susceptible to structural and design improvements to bring them at least even with the innovations of that which they carried, the personal watercraft.

Therefore, there is a need for a means for carrying both a personal watercraft and a boat on the same vehicle.

SUMMARY OF THE INVENTION

The above-discussed disadvantages of the prior art are overcome by a combined boat and jet ski towing trailer which includes a jet ski support ramp on the arm that connects a trailer body to the towing vehicle. The jet ski supporting ramp is inclined and oriented at an oblique angle to the longitudinal axis of the trailer body to facilitate loading and unloading.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 1 is a top plan view of a towing trailer embodying the present invention.

FIG. 2 is a side elevational view of a towing trailer embodying the present invention.

FIG. 3 is a perspective view of a towing trailer embodying the present invention with a boat and a jet ski in place on the trailer.

DETAILED DESCRIPTION OF THE INVENTION

Referring to the figures, it can be understood that the present invention is embodied in a combined towing trailer 10. Trailer 10 comprises a main body 12 which includes a first end 14 which is a forward end when the body is in use, a second end 16 which is a rear end when the body is in use and a longitudinal axis 18 which extends between first end 14 and second end 16. A first side rail 20 connects first end 14 to second end 16 and a second side rail 22 connects first end 14 to second end 16 and is spaced apart from the first side rail in the direction of a transverse axis 24 which extends between the first side rail and the second side rail.

A plurality of wheels, such as wheel 26, is mounted on the main body adjacent to second end 16. A plurality of cross beams, such as cross beam 28, extend between first side rail 20 and second side rail 22 and are spaced apart from each other in the direction of longitudinal axis 18. A first surface 30 is a top surface when the main body is in use, with the use orientation being shown in FIGS. 2 and 3.

A boat support unit 40 is mounted on first surface 30 near second end 16 of body 12. A connection unit 50 connects main body 12 to a towing vehicle, such as a truck or car or the like. Connection unit 50 is integral with main body 12 and is located on first end 14 of the main body. Connection unit 50 includes a first side arm 52 which has a first end 54 integral with first side rail 20 of the main body and a second end 54 spaced apart from first end 14 of the main body in the direction of longitudinal axis 18 of the main body. A second side arm 56 has a first end 58 which is integral with second side rail 22 of the main body and a second end 60 spaced apart from the first end of the main body in the direction of the longitudinal axis of the main body.

Second end 54 of the first side arm of the connection unit is connected to second end 60 of the second side arm of the connection unit at a location 62 that is on the longitudinal axis of the main body and which is spaced apart from the first end of the main body. A support strut 64 extends from the connection of the first and second side arm of the connection unit to the first end of the main body.

A plane 66 contains the first and second side arms of the connection unit and the support strut. Plane 66 is co-planar with first surface 30 of the main body. A connecting strut 70 has a first end 72 integral with the connection of the second ends of the first and second side arms of the connection unit and extends away from the connection of the second ends of the first and second side arms of the connection unit and is co-linear with support strut 64.

A jet ski support unit 80 is mounted on connection unit 50. The jet ski support unit includes a first side rail 82 mounted on the connection unit. First side rail 82 has a first end 84 located adjacent to first side arm 52 of the connection unit and adjacent to the connection of the second ends of the first and second side arms of the connection unit. First side rail 82 further includes a second end 86 located adjacent to the second side arm of the connection unit and adjacent to the first end of the main body.

First side rail 82 of the jet ski support unit extends at a first oblique angle $\theta_1$ to longitudinal axis 18 of the main body and at a second oblique angle $\theta_2$ to plane 66 which contains the first and second side arms of the connection unit and the support strut so that the first side rail of the jet ski support unit is inclined with respect to plane 66 which contains the first and second side arms of the connection unit and the support strut.

A second side rail 90 is mounted on the connection unit and has a first end 92 located adjacent to first side arm 52 of the connection unit and adjacent to the connection of the second ends of the first and second side arms of the connection unit. A second end 94 of rail 90 is located adjacent to the second side arm of the connection unit and adjacent to the first end of the main body. Second side rail 90 extends at first oblique angle $\theta_1$ to the longitudinal axis of the main body and at second oblique angle $\theta_2$ to plane 66 which contains the first and second side arms and the support strut so that the second side rail is inclined with respect to the plane which contains the first and second side arms of the connection unit and the support strut.

The first and second side rails of the jet ski support unit lie in a single plane 96 which is oriented at second oblique angle $\theta_2$ with respect to plane 66 which contains the first and second side arms of the connection unit and the support strut. A first cross strut 100 connects the first end of the first side rail of the jet ski support unit to the first end of the second side rail of the jet ski support unit, and a second cross strut 102 connects the second end of the first side rail of the jet ski support unit to the second end of the second side rail of the jet ski support unit. The oblique orientation of the jet ski support unit with respect to the main body permits easy loading and unloading of a jet ski while a boat is carried on the main body.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A combined towing trailer comprising:
    A) a main body which includes
        (1) a first end which is a forward end when the main body is in use,
        (2) a second end which is a rear end when the main body is in use,
        (3) a longitudinal axis which extends between the first end and the second end of the main body,
        (4) a first side rail which connects the first end to the second end of the main body,
        (5) a second side rail which connects the first end to the second end of the main body,
        (6) a transverse axis which extends between the first side rail and the second side rail of the main body,
        (7) a plurality of wheels mounted on the main body adjacent to the second end of the main body,
        (8) a plurality of cross beams which extend between the first side rail and the second side rail and are spaced apart from each other in the direction of the longitudinal axis of the main body,
        (9) a first surface that is a top surface when the main body is in use,
        (10) a boat support unit mounted on the first surface of the main body near the second end of the main body,
        (11) a connection unit which connects the main body to a towing vehicle, the connection unit being integral with the main body and being located on the first end of the main body, the connection unit including
            (a) a first side arm having a first end integral with the first side rail of the main body and a second end spaced apart from the first end of the main body in the direction of the longitudinal axis of the main body,
            (b) a second side arm having a first end integral with the second side rail of the main body and a second end spaced apart from the first end of the main body in the direction of the longitudinal axis of the main body,
            (c) the second end of the first side arm of the connection unit being connected to the second end of the second side arm of the connection unit at a location that is on the longitudinal axis of the main body and which is spaced apart from the first end of the main body,
            (d) a support strut which extends from the connection of the first and second side arm of the connection unit to the first end of the main body,
            (e) a plane which contains the first and second side arms of the connection unit and the support strut, the plane being co-planar with the first surface of the main body, and
            (f) a connecting strut which has a first end integral with the connection of the second ends of the first and second side arms of the connection unit and which extends away from the connection of the second ends of the first and second side arms of the connection unit and which is co-linear with the support strut; and
    B) a jet ski support unit mounted on the connection unit, the jet ski support unit including
        (1) a first side rail which is mounted on the connection unit and which has
            (a) a first end located adjacent to the first side arm of the connection unit and adjacent to the connection of the second ends of the first and second side arms of the connection unit,
            (b) a second end located adjacent to the second side arm of the connection unit and adjacent to the first end of the main body, and
            (c) the first side rail of the jet ski support unit extending at a first oblique angle to the longitudinal axis of the main body and extending at a second oblique angle to the plane which contains the first and second side arms of the connection unit and the support strut so that the first side rail of the jet ski support unit is inclined with respect to the plane which contains the first and second side arms of the connection unit and the support strut,
        (2) a second side rail which is mounted on the connection unit and which has
            (a) a first end located adjacent to the first side arm of the connection unit and adjacent to the connection of the second ends of the first and second side arms of the connection unit,
            (b) a second end located adjacent to the second side arm of the connection unit and adjacent to the first end of the main body, and
            (c) the second side rail extending at the first oblique angle to the longitudinal axis of the main body and extending at the second oblique angle to the plane which contains the first and second side arms and the support strut so that the second side rail is inclined with respect to the plane which contains the first and second side arms of the connection unit and the support strut,
- (3) the first and second side rails of the jet ski support unit lying in a single plane which is oriented at the second oblique angle with respect to the plane which contains the first and second side arms of the connection unit and the support strut,
- (4) a first cross strut connecting the first end of the first side rail of the jet ski support unit to the first end of the second side rail of the jet ski support unit, and
- (5) a second cross strut connecting the second end of the first side rail of the jet ski support unit to the second end of the second side rail of the jet ski support unit.

2. A combined towing trailer comprising:

A) a main body which includes
- (1) a first end which is a forward end when the main body is in use,
- (2) a second end which is a rear end when the main body is in use,
- (3) a first surface that is a top surface when the main body is in use,
- (4) a boat support unit mounted on the first surface of the main body near the second end of the main body,
- (5) a connection unit which connects the main body to a towing vehicle, the connection unit being integral with the main body and being located on the first end of the main body, the first and second ends defining a longitudinal axis of the main body; and B) a jet ski support unit mounted adjacent to the connection unit, the jet ski support unit adapted to support a jet ski, the jet ski support unit having a first end and a second end defining a longitudinal axis of the jet ski supporting unit, and the longitudinal axis of the jet ski support unit positioned in an oblique angle relative to the longitudinal axis of the main body substantially along the first surface.

3. The combined towing trailer according to claim 2, where the jet ski support is between the boat support unit and the connection unit.

* * * * *